(12) United States Patent
Levasseur et al.

(10) Patent No.: US 7,330,507 B2
(45) Date of Patent: Feb. 12, 2008

(54) APPARATUS AND METHOD FOR MULTI-CHANNEL EQUALIZATION

(75) Inventors: Jeffrey K. Levasseur, Owens Cross Roads, AL (US); Brent A. Worley, Madison, AL (US)

(73) Assignee: United States of America as Represented by the Secretary of the Army, Washington, DC (US)

( * ) Notice: Subject to any disclaimer, the term of this patent is extended or adjusted under 35 U.S.C. 154(b) by 751 days.

(21) Appl. No.: 10/774,647

(22) Filed: Feb. 3, 2004

(65) Prior Publication Data

US 2005/0169359 A1    Aug. 4, 2005

(51) Int. Cl.
*H03H 7/40*    (2006.01)

(52) U.S. Cl. ...................... 375/232; 375/350

(58) Field of Classification Search ........ 375/229–232, 375/260, 285, 350; 455/561, 62, 63.1, 67.11, 455/67.13, 114.2, 132–135
See application file for complete search history.

(56) References Cited

U.S. PATENT DOCUMENTS

| | | | | |
|---|---|---|---|---|
| 4,677,647 A | * | 6/1987 | Aoyagi | ........................ 375/344 |
| 5,357,257 A | | 10/1994 | Nevin | ......................... 342/165 |
| 6,101,399 A | * | 8/2000 | Raleigh et al. | ............. 455/561 |
| 7,042,953 B2 | * | 5/2006 | Schneider et al. | .......... 375/260 |

\* cited by examiner

*Primary Examiner*—Khanh C. Tran
(74) *Attorney, Agent, or Firm*—Dayn T. Beam

(57) ABSTRACT

A communication system with a multi-channel array antenna utilizes a receiver matching process that adapts the pass band frequency response of each channel to a selected reference channel. This process is implemented digitally by inserting a tapped delay line filter in each channel, selecting one of the channels as a reference, and adapting the others to match the reference in both phase and amplitude. The process is performed for each system calibration cycle, which occurs just before receive data is captured and processed. The improvements include an apparatus and an algorithm that select a reference channel in the adaptive process during each system calibration cycle, producing optimal, or near optimal, channel matching.

7 Claims, 2 Drawing Sheets

APPARATUS AND METHOD FOR MULTI-CHANNEL EQUALIZATION

DEDICATORY CLAUSE

The invention described herein may be manufactured, used and licensed by or for the Government of the United States of America for governmental purposes without the payment to the inventors of any royalties thereon.

BACKGROUND OF THE INVENTION

Multi-channel array antennas in various systems have been used to digitally form antenna beams for the past few decades. By digitally forming the antenna beam, adaptive processing techniques can be implemented to shape beam patterns so that energy received in the direction of interference is minimized while energy received in the direction of the desired signal is maximized. This process is typically referred to as adaptive beam forming. Some examples of applications implementing adaptive beam forming techniques include radar, sonar, seismic, imaging, cellular, satellite, and global positioning systems.

Adaptive beam forming processes attenuate interference signals impinging on the antenna array by placing beam pattern nulls in the direction of the interference. However, the amount of attenuation is limited by the level of matching between the channels. A relatively recent method for achieving high levels of receiver channel matching employs the use of adaptive channel equalization. In such a process, analog signals are received by individual antennas, propagated through the receiving hardware of each channel, converted to digital signals, equalized, and finally combined to form the antenna beam. Therefore, any system employing adaptive beam forming can implement adaptive channel equalization techniques for receiver channel matching.

The receiver channel matching is accomplished digitally by inserting a tapped delay line filter in each channel, selecting a reference channel, and generating equalization tap weights to match the channels to the reference in both phase and amplitude. This process is performed for each system calibration cycle, which occurs just before receive data is captured and processed. The equalization is typically performed every system operational cycle, or dwell. Matching the channels in this manner improves the channel matching results and reduces the cost and complexity of receiver hardware by decreasing manufacturing tolerances. The level of matching achieved is determined by the number of filter taps, the signal to noise ratio (SNR) of the channels, and the reference channel characteristics. Given that the number of filter taps is limited by the processing throughput and the SNR is sufficient, improved matching can be achieved by intelligently selecting the reference channel. Previous implementations of this matching procedure chose an arbitrary, but properly functioning channel, as a reference during system initialization. The reference channel could then fail or degrade over time and greatly reduce the channel matching. One such method of channel equalization is described in U.S. Pat. No. 5,357,257. In that patent at page 7, lines 63-66, the inventor states that any operating channel can be chosen as the reference channel. The present invention improves upon this prior art by choosing a reference channel during system calibration cycles that produces the optimal, or near optimal, channel matching.

SUMMARY OF THE INVENTION

An improved channel matching apparatus and process that matches the pass band frequency response of each channel to a selected reference channel is disclosed for systems with a multi-channel array antenna. The preferred embodiment of this invention is implemented digitally by inserting a tapped delay line filter in each channel, selecting one of the channels as a reference, and adapting the others to match the reference in both phase and amplitude. The improved matching is performed for each system calibration cycle, which occurs just before receive data is captured and processed. The improvement consists of an apparatus and a method that intelligently select a reference channel for the adaptive process during system calibration cycles, producing optimal, or near optimal, channel matching. Once the channel matching is performed, the adaptive beam forming is completed.

Accordingly, one object of the present invention is to provide an apparatus and method for improving the channel equalization in a multi-channel communication system by intelligently selecting during each calibration cycle an optimal, or near optimal, reference channel.

Another object of the present invention is to provide an apparatus and method for selecting the reference channel sufficiently fast so that the reference channel selection can be performed during system calibration cycles.

Still, another object of the present invention is to provide an apparatus and method for selecting the reference channel that doesn't impose a severe drain on system resources.

DESCRIPTION OF THE PREFERRED EMBODIMENT

Figure 1:
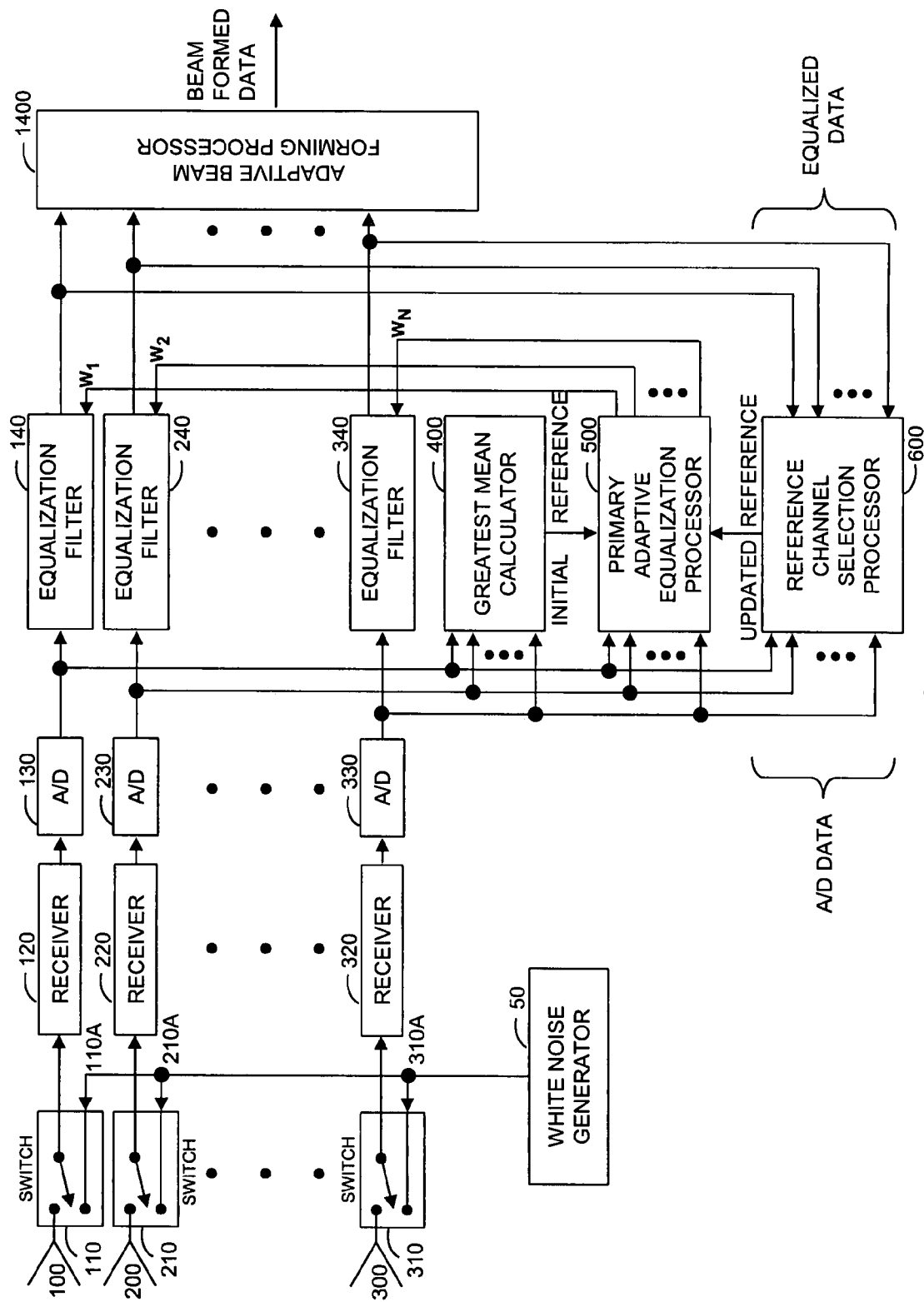
FIG. 1 is a block diagram of a typical multi-channel communication system that employs adaptive equalization to achieve the system channel matching and shows the improved reference channel selection processor and the initial reference selection by a greatest means calculator.

Referring now to the drawings wherein like numbers represent like parts

FIG. 1 shows a multi-channel communication system that performs equalization using adaptive processing techniques. During system operation, signals are received through inputs 100, 200, and 300, which correspond to receiver 120, receiver 220, and receiver 320. During system calibration, a white noise generator 50 is switched so that input 110A goes to receiver 120, input 210A goes to receiver 220, and input 310A goes to receiver 320. Any number of channels may be employed as is appropriate for a given application.

The first receiver channel includes a switch controlling inputs 100 and 110A which in turn are coupled to receiver 120. The output of receiver 120 is the input of analog-to-digital (A/D) converter 130 for sampling the signal received by receiver 120 and providing resultant samples to primary equalization filter 140, to the greatest mean calculator 400, to the primary adaptive equalization processor 500, and to the reference channel selection processor 600. The characteristics of the equalization filter 140 can be changed by the weight vectors output W from the primary adaptive equalization processor 500, which will be discussed later.

The second receiver channel includes a switch 210, a receiver 220, an A/D converter 230, and a primary equalization filter 240 which are all substantially identical to the respective corresponding components of the first receiver channel. The third receiver channel also includes a switch 310, a receiver 320, an A/D converter 330, and a primary equalization filter 340 which are all substantially identical to the respective corresponding components of the other two receiver channels.

Again the outputs of the A/D converters 130, 230, and 330 are coupled to, and become the inputs for: the primary equalization filters 140, 240, and 340; the greatest mean processor 400; the primary adaptive equalization processor 500; and the reference channel selection processor 600 such that samples from the three receiver channels are provided to each processor. The greatest mean processor 400 determines the channel with the greatest mean calibration signal for an initial reference input to the primary adaptive equalization processor 500. After the initial reference input, the reference channel selection processor 600, provides subsequent updated reference inputs to the primary adaptive equalization processor 500 as explained below. The primary adaptive equalization processor 500 calculates weight vectors, $w_1, w_2, ---, w_N$, which are provided as inputs to the equalization filters 140, 240, and 340. These weight vectors contain the equalization filter coefficients such that when applied to the A/D data input to the primary equalization filters, the data is then equalized.

The outputs of primary equalization filters 140, 240, and 340 constitute the equalized output of the respective receiver channels. These equalized outputs from the receiver channels are coupled to, and become the inputs for, an adaptive beam forming processor 1400. Conventional adaptive beam forming processors which generate beam weights that attenuate signals in the direction of interference are well known in the art and are not shown here.

In the prior art such as U.S. Pat. No. 5,357,257, the channel match processor (numbered 500 in that patent) employs any of the "operating channels" without discrimination as the reference channel. There is no suggestion or teaching as to the advantages of intelligently selecting a specific operating channel so as to achieve the objectives noted above. The present invention improves upon the prior art by employing a greatest mean component, 400, to initially select a reference channel and then employs the reference channel selection processor, 600, to intelligently update that reference channel during every cycle. It is this apparatus and method for intelligently choosing a reference channel during each cycle which represents the improvement over the prior art.

Figure 2:
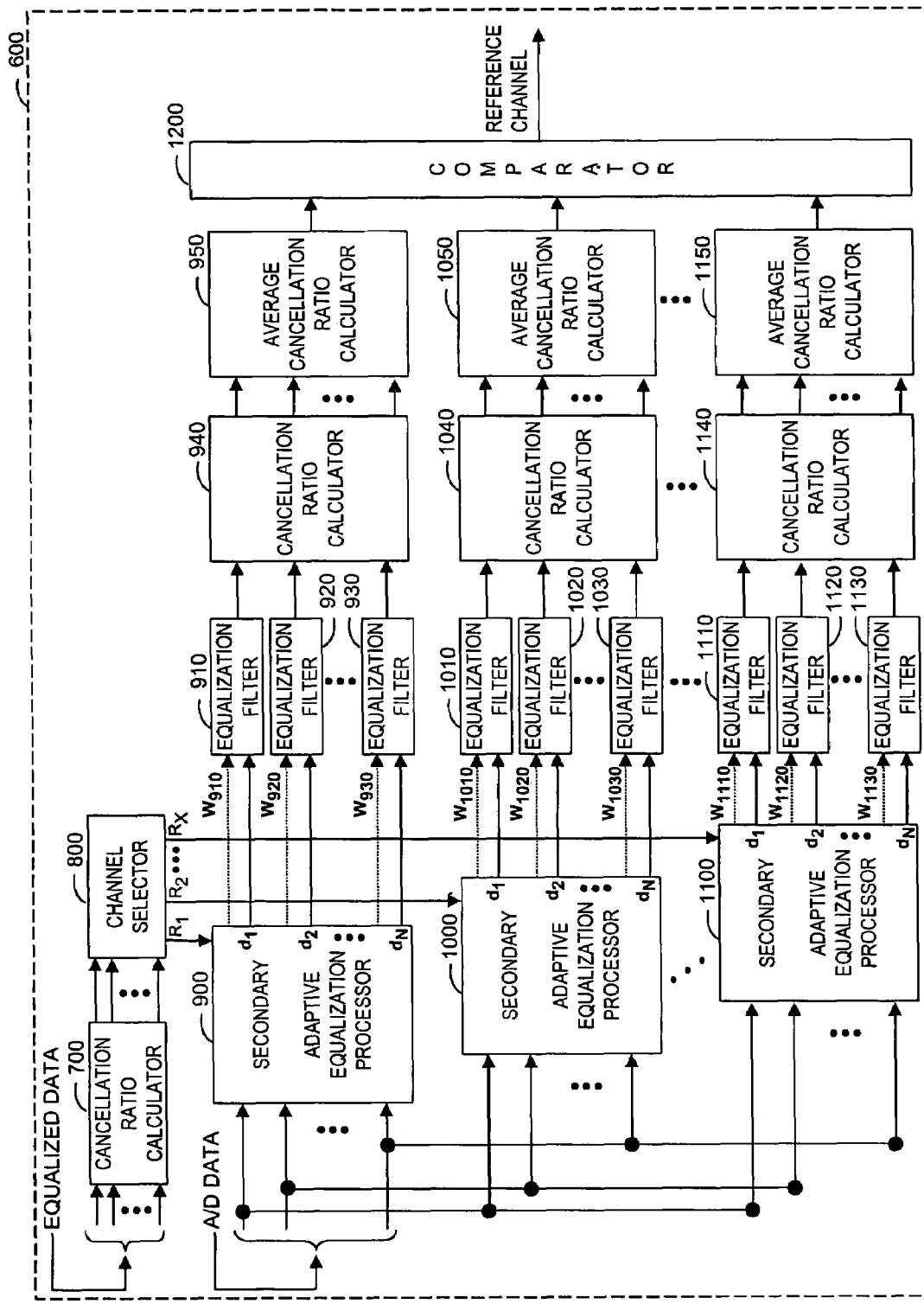
FIG. 2 is a block diagram of the preferred embodiment of the improved reference channel selection processor.

A block diagram of the preferred embodiment of an improved reference channel selection processor 600 is shown in FIG. 2. The equalized data from primary equalization filters 140, 240, and 340 is coupled to and becomes the input for, the primary cancellation ratio calculator 700. This primary calculator determines the cancellation ratio of each channel. The output of the primary cancellation ratio calculator 700 is coupled to, and becomes the input for channel selector 800, which selects a number of channels, X, beginning with that channel having the largest cancellation ratio and continuing with the next largest, and so on ($R_1, R_2, \ldots R_x$). The number X is limited by the processing throughput of the system and the time between calibration cycles. The number X should be chosen to be as large as the system can tolerate. A practical rule is to choose X to be approximately 5% of the number of channels in the system. The output of the channel selector 800 is the X channels to be used for references in the same number of corresponding secondary adaptive equalization processors represented here by components 900, 1000, and 1100.

The A/D converter data input into the reference channel selection processor 600 is coupled to, and becomes inputs for, the secondary adaptive equalization processors 900, 1000, and 1100. These secondary adaptive equalization processors calculate weighting vectors for inputs to the secondary equalization filters. For example secondary adaptive equalization processor 900 calculates the weight vectors for secondary equalization filters 910, 920, and 930, secondary adaptive equalization processor 1000 calculates the weight vectors for secondary equalization filters 1010, 1020, and 1030, and secondary adaptive equalization processor 1100 calculates the weight vectors for secondary equalization filters 1110, 1120, and 1130. These secondary adaptive equalization processors 900, 1000, and 1100, operate in the same manner as the primary adaptive equalization processor 500 of FIG. 1. In each secondary adaptive equalization processor, a portion of the sampled data from each channel, as determined by the system equalization process design, is used to calculate the equalization filter weights. The rest of the samples are vectors ($d_1, d_2 \ldots d_n$) which are inputs to the corresponding secondary equalization filters. Additional inputs to the secondary equalization filters are the adaptive weight vectors, which are denoted as $w_{910}, w_{920} \ldots w_{1130}$, in FIG. 2. This equalization process is fully discussed for FIG. 1 and not repeated for FIG. 2. Specifically, the remaining samples for each channel from secondary adaptive equalization processor 900 are equalized by equalization filters 910, 920, and 930, the remaining samples for each channel from secondary adaptive equalization processor 1000 are equalized by secondary equalization filters 1010, 1020, and 1030, and the remaining samples for each channel from secondary adaptive equalization processor 1100 are equalized by secondary equalization filters 1110, 1120, and 1130.

The outputs of secondary equalization filters 910, 920, and 930 are the inputs to the secondary cancellation ratio calculator 940, whose output is the input to the average cancellation ratio calculator 950. The output of the average cancellation ratio calculator 950 is the average of the cancellation ratios output from secondary cancellation ratio calculator 940. This structure and process is repeated for the remaining secondary equalization filters.

The outputs of the secondary average cancellation ratio calculators 950, 1050, and 1150 are inputs to the comparator 1200. This comparator selects the channel with the largest average cancellation ratio as the updated reference channel for the primary adaptive equalization processor 500 of FIG. 1.

We claim:

1. In a method for equalizing a multi-channel electronic communication system by employing any initial reference channel of the type wherein input signals and an independently generated noise are received and are converted from analog to digital and the channels are adaptively equalized, and then employing an initial set of equalized data for adaptive beam forming, the improvement comprising the following steps:

(a) selecting from the initial set of equalized data a systemically significant number of channels having the largest cancellation ratio;

(b) utilizing the selected number of channels as an updated input for a second equalization process applied to then operating channels of the system resulting in a second set of equalized data;

(c) employing the second set of equalized data to determine an updated reference channel for input to the equalization process; and (d) repeating the steps (a) through (c) substituting the most recently updated reference channel for the initial reference channel.

2. The method of claim 1, wherein the initially selected reference channel is that channel having the greatest mean calibration signal.

3. The method of claim 1, wherein the number of channels to be selected is maximized by sampling as many of the available channels as is practical given the limitations of the system.

4. The method of claim 1, wherein the step (d) (repeating of the steps (a) through (c)) occurs during each operation cycle.

5. In an apparatus for equalizing a multi-channel electronic communication system by employing an initial reference channel of the type wherein the input signals and a separately generated noise are received by a means for receiving in analog form, transmitted to a means for converting component which provides a digital output to a means for adaptively equalizing the digital output, and providing a first set of equalized data which first set of equalized data is transmitted as an input to the adaptive beam forming component, where the transmission, generation, sending and providing of such signals in the existing and improved apparatus are by appropriate means for such functions, the improvement comprising:

a means for a primary calculation of a cancellation ratio of each channel, said primary calculating means being connected to receive from the existing equalization apparatus a transmission of the first set of equalized data and then to provide an output of the calculated primary cancellation ratios:

a means for selecting a systemically significant number of channels having the largest cancellation ratio, said selecting means being connected to receive an input from the primary cancellation ratio calculator and to provide as an output the systemically significant number of selected channels;

a means for adaptively equalizing each channel by utilizing the analog-to-digital (A/D) converted data from the existing equalization apparatus and the output of the means for channel selection, said equalizing means being connected to receive transmissions of the A/D data and the channels selected as inputs and to provide a second set of equalized data as an output;

a means for a secondary calculation of a secondary cancellation ratio of each channel, said means being connected to receive as input the second set of equalized data and then to provide an output of the calculated secondary cancellation ratios;

a means for averaging the secondary calculated cancellation ratios for each channel, said averaging means being connected to receive as input the secondary cancellation ratios and to transmit as output the averaged cancellation ratios; and a means for comparing the average cancellation ratios for each channel to identify a channel with the largest average cancellation ratio, said comparing means being connected to receive as input the average cancellation ratios and to transmit as output the identified largest cancellation ratio channel; and a means for repeatedly substituting the most recently identified largest cancellation ratio channel for the previously employed reference channel.

6. The apparatus of claim 5, wherein the channel selecting means maximizes the number of channels selected by sampling as many of the available channels as is practical given the limitations of the system.

7. The apparatus of claim 5, wherein the substituting means works in combination with all other means and components to substitute the most recently identified largest average cancellation ratio channel for the previously employed reference channel during each operation cycle.

* * * * *